United States Patent
Smith et al.

(10) Patent No.: US 6,795,914 B2
(45) Date of Patent: Sep. 21, 2004

(54) SYSTEM AND METHOD FOR SELECTIVELY EXECUTING PROGRAMS IN RESPONSE TO A REBOOT IN A COMPUTER SYSTEM

(75) Inventors: T. Gavin Smith, Pflugerville, TX (US); Terry Wayne Liles, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 596 days.

(21) Appl. No.: 09/769,853

(22) Filed: Jan. 25, 2001

(65) Prior Publication Data

US 2002/0099935 A1 Jul. 25, 2002

(51) Int. Cl.[7] .............................................. G06F 9/445
(52) U.S. Cl. ................................................. 713/2; 713/1
(58) Field of Search ............................... 713/1, 2, 100; 717/174, 177, 178

(56) References Cited

U.S. PATENT DOCUMENTS 5,894,571 A    4/1999  O'Connor
6,041,395 A    3/2000  Beelitz
6,604,238 B1 *  8/2003  Lim et al. .................... 717/177

FOREIGN PATENT DOCUMENTS

GB    2365169 A  *  2/2002  ............ G06F/9/445

OTHER PUBLICATIONS

"Software Custom Installation for Nodes in a Network." IBM Technical Disclosure Bulletin, Mar. 1, 1992, US, pp. 13–17.*

* cited by examiner

*Primary Examiner*—Lynne H. Browne
*Assistant Examiner*—Paul Yanchus, III
(74) *Attorney, Agent, or Firm*—Haynes and Boone, LLP

(57) ABSTRACT

A system and method that include detecting a reboot request and, in response to detecting the reboot request, removing a first entry associated with a first program from an execute list are provided. The system and method also include rebooting the computer system, and, in response to rebooting the computer system, initiating a second program associated with a second program entry on the execute list.

19 Claims, 3 Drawing Sheets

SYSTEM AND METHOD FOR SELECTIVELY EXECUTING PROGRAMS IN RESPONSE TO A REBOOT IN A COMPUTER SYSTEM

This application relates to co-pending U.S. patent application Ser. No. 09/315,657, filed on May 20,1999, entitled "Method and Apparatus for Windows-Based Installation for Installing Software on Build-to-Order Computer Systems", naming Bobby G. Doran, Jr., Bill Hyden, and Terry Wayne Liles as inventors.

This application relates to co-pending U.S. patent application Ser. No. 09/333,786, filed on Jun. 15, 1999, entitled "Method and Apparatus for Testing Custom-Configured Software/Hardware Integration in a Computer Build-to-Order Manufacturing Process", naming Thomas Vrhel Jr., Gaston M. Barajas, Paul J. Maia, and W. D. Todd Nix as inventors.

This application relates to U.S. Pat. No. 6,041,395, filed on Dec. 3, 1997, entitled "System and Method for Changing Partition Mappings to Logical Drives in a Computer Memory", naming Alan E. Beelitz as inventor.

The patent and co-pending applications are incorporated by reference in their entirety, and are assigned to the assignee of this application.

BACKGROUND

The disclosures herein relate generally to build-to-order computer systems and more particularly to a system and method for selectively executing programs in response to a reboot in a build-to-order computer system.

In the process of manufacturing a build-to-order computer system, software layering is often needed. Software layering refers to the process in which one or more programs or applications are installed onto a computer system as individual components on an as-needed basis. Unfortunately, many of these layered programs schedule other programs to run on subsequent reboots of the computer system. These other programs are usually components of the main program that either help the main program function or provide an additional service to the end-user. During the manufacturing process, these other programs are not needed and often cause failures in the software installation process.

The failures caused by these other programs often occur when the programs cause splash screens or dialog boxes that require user intervention to appear. The splash screens or dialog boxes may prevent the initiation of other programs until a user response is received. The programs that cause splash screens or dialog boxes to appear may utilize reboot counters or other timing mechanisms which cause the splash screens or the dialog boxes to appear at unpredictable times during the manufacturing process. Accordingly, these programs can cause unpredictable behavior to occur during the manufacturing process and can increase the time needed to manufacture a computer system. They can also affect the behavior of the software on the final product as delivered to the customer.

It would be desirable to be able to prevent programs that cause splash screens, dialog boxes, or other undesired results from being initiated during the process of manufacturing a computer system. Therefore, what is needed is a system and method for selectively executing programs in response to a reboot in a computer system.

SUMMARY

One embodiment, accordingly, provides a system and method that include detecting a reboot request and, in response to detecting the reboot request, removing a first entry associated with a first program from an execute list. The system and method also include rebooting the computer system, and, in response to rebooting the computer system, initiating a second program associated with a second program entry on the execute list.

A principal advantage of this embodiment is that it prevents splash screens, dialog boxes, or other undesired behavior generated by programs installed on a computer system from interrupting the manufacturing process. By identifying a set of programs that need to be initiated and executed during the manufacturing process, the computer system is configured to initiate only these required programs in response to a reboot of the computer system during the manufacturing process. After the manufacturing process is completed, the computer system is configured to initiate other programs in addition to the required programs. The other programs may include programs that generate splash screens or dialog boxes.

DETAILED DESCRIPTION

Figure 1:
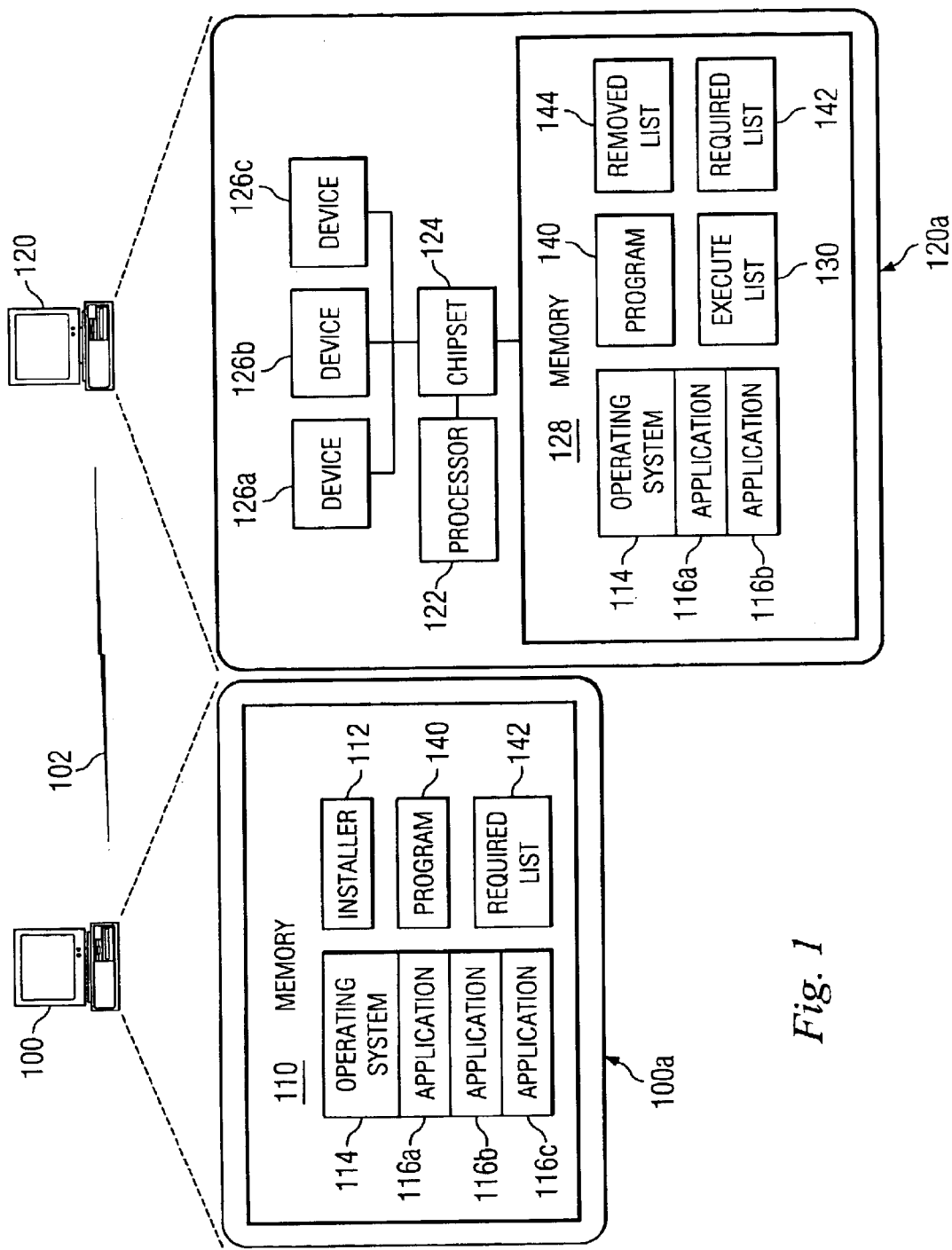
FIG. 1 is a diagram illustrating an embodiment of a computer system coupled to a server.

FIG. 1 is a diagram illustrating an embodiment of a build-to-order computer system 120 configured to communicate with a server 100. Computer system 120 may be coupled to server 100 in any suitable way as indicated by a connection symbol 102. Connection symbol 102 represents a computer network, a direct electrical connection, a wireless connection, or any other connection configured to allow server 100 and computer system 120 to communicate.

Server 100 is a computer system that is configured to install software on computer system 120 during a manufacturing process. Accordingly, server 100 includes a memory 110 configured to store an installer 112, an operating system 114, a plurality of applications 116a, 116b, and 116c, a program 140, and a required list 142 as shown in a box 100a. Installer 112 is executable to cause operating system 114 and any of applications 116a, 116b, or 116c to be installed on computer system 120. Applications 116a, 116b, and 116c may include one or more programs that are separately executable. Installer 112 also causes program 140 and required list 142 to be installed on computer system 120.

As indicated by a box 120a, computer system 120 includes a processor 122, a chipset 124, a plurality of devices 126a, 126b, and 126c, and a memory 128. As shown in FIG. 1, installer 112 causes operating system 114, application 116a, application 116b, program 140, and required list 142 to be installed into memory 128 on computer system 120. Installer 112 may also cause other programs to be installed or not installed based on an order list generated from an order from a customer.

Memory 128 also includes an execute list 130 and a removed list 144. Execute list 130 identifies one or more programs to be initiated and executed in response to computer system 120 being booted or rebooted. The process of booting or rebooting computer system 120 refers to the process of executing software such as a basic input output system (BIOS), firmware, or one or more other programs or routines to initialize the components of computer system 120 in response to computer system 120 being powered up or reset. During or after the boot process, computer system 120 detects execute list 130 and causes each program identified by execute list 130 to be initiated and executed. Using execute list 130, computer system 120 may automatically initiate one or more programs in response to being booted or rebooted.

In the process of manufacturing computer system 120, an operating system, such as operating system 114, one or more applications, such as applications 116a and 116b, and/or other programs are installed onto computer system 120 using installer 112. As part of its installation process, each piece of software may cause one or more entries to be added to execute list 130. Each entry added to execute list 130 is associated with a program that is to be initiated and executed in response to computer system 120 being rebooted. In addition, each piece of software that is installed onto computer system 120 may request that computer system 120 be rebooted after the software is installed. Accordingly, computer system 120 may be rebooted one or more times during the software installation process in response to detecting one or more reboot requests.

Certain programs that are added to or included in execute list 130 may not be needed in the manufacturing process, i.e. they do not need to be initiated and executed by computer system 120 upon a reboot during the manufacturing process. These programs may cause splash screens or dialog boxes that require a user response or other unpredictable behavior to occur during the manufacturing process.

Required list 142 identifies one or more programs that need to be initiated and executed in response to a reboot of computer system 120 during the manufacturing process. Required list 142 may be generated by the computer manufacturer and may be changed or tailored according to the needs of a particular platform, a particular operating system, a particular product line, or other variables in the manufacturing process of computer system 120. Program 140 includes instructions that are configured to cause computer system 120 to identify programs that need to be initiated and executed in response to a reboot during the manufacturing process using execute list 130 and required list 142.

Prior to booting or rebooting during the manufacturing process, program 140 causes execute list 130 to be compared to required list 142 to identify those programs in execute list 130 that are not needed during the manufacturing process. In response to identifying these programs, program 140 causes execute list 130 to be altered to prevent these programs from being initiated or executed in response to a reboot during the manufacturing process. Program 140 may cause execute list to be altered in any suitable way, such as by removing or modifying entries associated with the identified programs, to prevent the identified programs from being initiated or executed in response to a reboot during the manufacturing process.

In one embodiment, program 140 causes computer system 120 to move entries associated with these programs from execute list 130 to removed list 144. In response to a reboot during the manufacturing process, computer system 120 causes the programs identified by execute list 130 to be initiated and executed but it does not cause programs identified by removed list 144 to be initiated or executed. In this way, computer system 120 causes only those programs that are needed during the manufacturing process to be initiated and executed in response to a reboot of computer system 120. After the manufacturing process completes, program 140 causes the entries in removed list 144 to be returned or moved back to execute list 130. Accordingly, all programs identified by execute list 130, whether needed or not needed during the manufacturing process, will be initiated and executed by computer system 120 after the manufacturing process is completed.

Figure 2A:
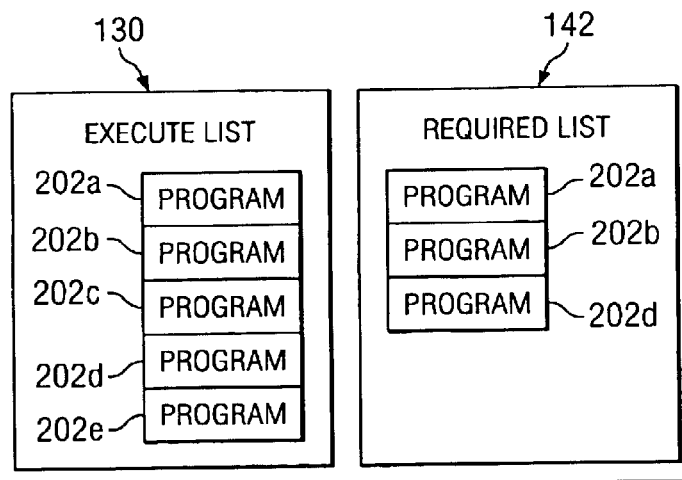
FIG. 2a is a diagram illustrating an embodiment of an execute list and a required list.
Figure 2B:
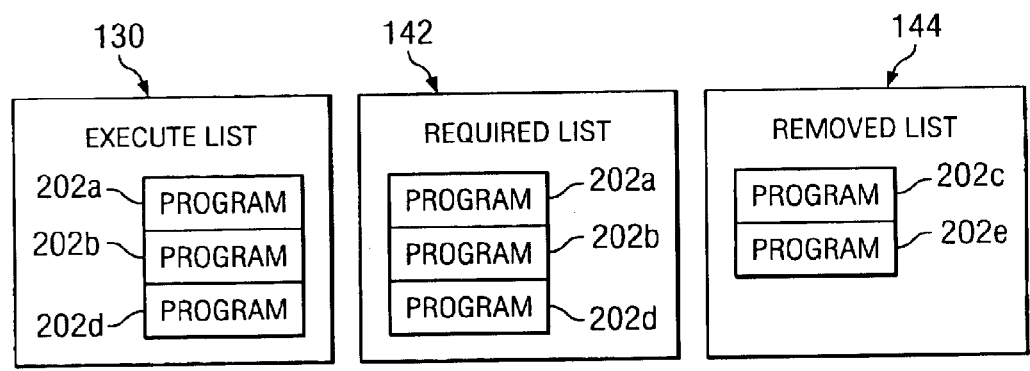
FIG. 2b is a diagram illustrating an embodiment of an execute list, a required list, and a removed list.
Figure 2C:
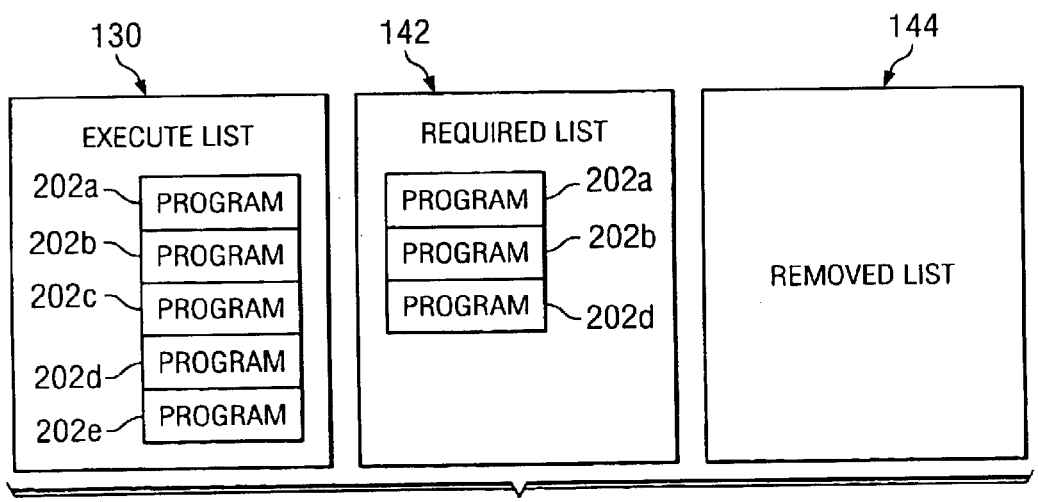
FIG. 2c is a diagram illustrating an embodiment of an execute list, a required list, and a removed list.

The operation of this embodiment of program 140 may be seen by way of example using FIGS. 2a, 2b, and 2c which are diagrams illustrating an example of an embodiment of an execute list, a required list, and a removed list at various times during the manufacturing process of computer system 120.

During the manufacturing process, installer 112 installs software such as operating system 114 and applications 116a and 116b onto computer system 120. After each piece of software is installed, computer system 120 determines whether the software has requested a reboot. If a reboot has not been requested, then installer 112 continues the process of installing software onto computer system 120 until either a reboot is requested or the installation process completes.

In response to a reboot being requested, program 140 causes execute list 130 and require list 142 to be detected and compared. As shown in the example of FIG. 2a, execute list 130 includes entries 202a, 202b, 202c, 202d, and 202e and required list includes entries 202a, 202b, and 202d. Each entry 202a, 202b, 202c, 202d, and 202e is associated with a different program. Using execute list 130 and required list 142, program 140 determines which programs identified by execute list 130 need to be initiated and executed in response to a reboot during the manufacturing process. As shown in FIG. 2b, program 140 causes entries associated with the remaining programs to be moved to removed list 144. Accordingly, entries 202c and 202e are moved to removed list 144 as they do not appear in required list 142. In response to computer system 120 being rebooted during the manufacturing process, only the programs identified by execute list 130, i.e. programs associated with entries 202a, 202b, and 202d, will be initiated and executed. Programs identified by removed list 144, i.e. programs associated with entries 202c and 202e, will not be initiated and executed in response to a reboot during the manufacturing process.

After the manufacturing process completes, i.e. no additional software needs to be installed onto computer system 120, program 140 causes entries 202c and 202e in required list 144 to be returned to execute list 130 as shown in FIG. 2c. Accordingly, the programs identified by execute list 130, i.e. the programs associated with entries 202a, 202b, 202c, 202d, and 202e, will all be initiated and executed in response to a boot or a reboot subsequent to the manufacturing process.

Many variations from the embodiment of FIG. 1 are possible and contemplated. For example, other embodiments may include other types and numbers of programs or other software that may be installed on computer system 120. In addition, installer 112 may be executed by a computer system other than server 100. Further, computer system 120 may be any type of computing device configured to execute software such as a laptop computer, a personal digital assistant (PDA), or a mobile telephone. Accordingly, other embodiments of computer system 120 may include a different set of components from those shown in the embodiment of FIG. 1.

In other embodiments, program 140 may be executed remotely by server 100 or another computer system. In addition, program 140 may access required list 142 from server 100 or another storage location external to computer system 120. Program 140 may be stored onto any suitable storage apparatus such as a CD-ROM or floppy disk that is accessible by computer system 120 or server 100.

Figure 3:
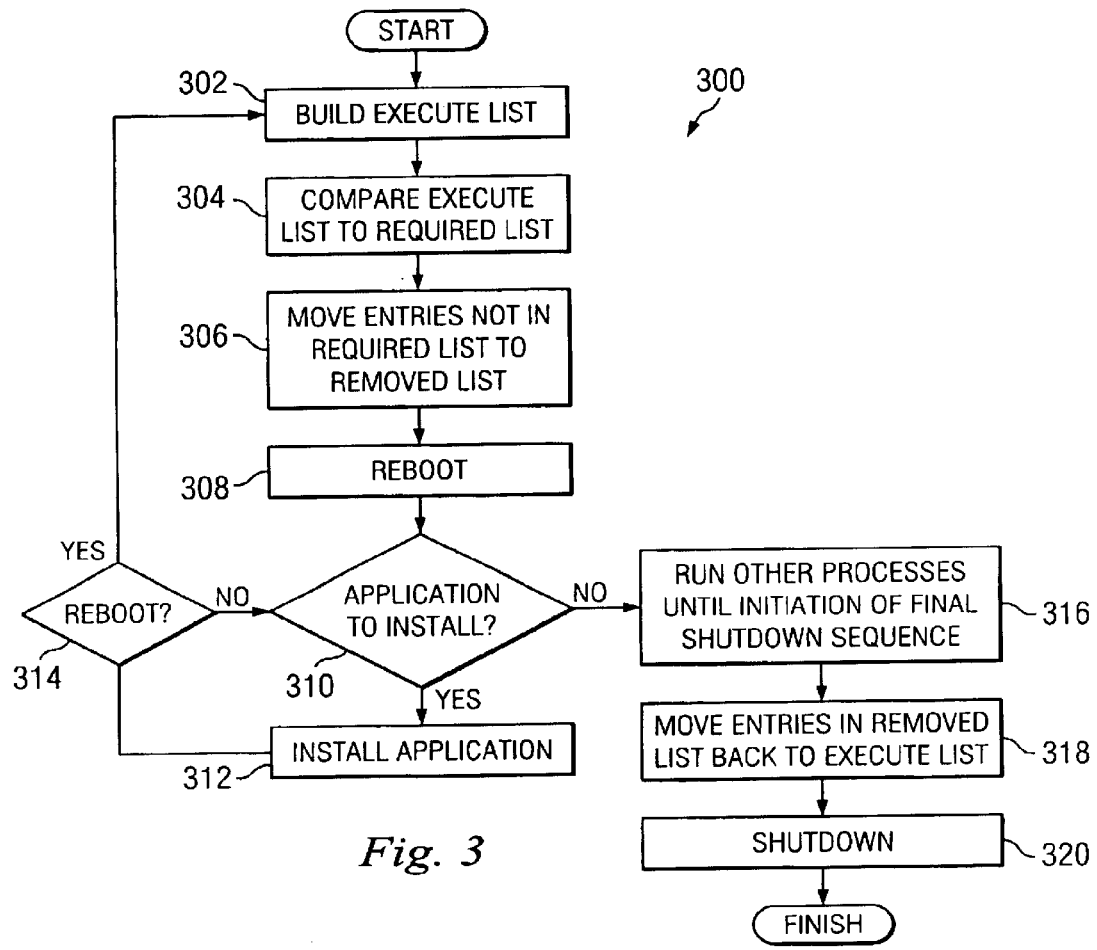
FIG. 3 is a flow chart illustrating an embodiment of a method for selectively executing programs in response to a reboot in a computer system.

FIG. 3 is a flow chart 300 illustrating an embodiment of a method for selectively executing programs in response to a reboot in a computer system. In FIG. 3, an execute list is built as indicated in step 302. The execute list identifies programs that are to be initiated by the computer system after the computer system is rebooted. The execute list may be built by storing entries associated with each program to be initiated upon reboot in a central location on the computer system. An application that is installed on the computer system may add one or more entries to the execute list as part of its installation process.

The execute list is compared to a required list as indicated at step 304. The required list identifies programs that need to be initiated after the computer system reboots. These programs may be selected by a manufacturer of the computer system and may include an operating system or other types of programs. The required list may include entries associated with the programs to be initiated by the computer system after the computer system reboots. Entries that appear in the execute list but do not appear in the required list are moved to a removed list as indicated in step 306. After the action of step 306 is performed, the execute list does not include entries associated with programs other than those that appear on the required list. The computer system is rebooted as indicated in step 308.

A determination is made as to whether there is an application to install as indicated in step 310. If there is an application to install, then the application is installed as indicated in step 312. A determination is then made as to whether a reboot is needed as indicated in step 314. The reboot may be requested by the application installed in step 312. If a reboot is needed, then steps 302 through 310 are repeated as indicated. If a reboot is not needed, then the determination of step 310 is repeated.

In response to determining that an application does not need to be installed in step 310, other processes are run until initiation of a final shutdown sequence as indicated in step 316. Entries in the removed list are moved back to the execute list as indicated in step 318, and the computer system is shutdown as indicated in step 320.

As can be seen, the principal advantages of these embodiments are that they prevent splash screens, dialog boxes, or other undesired behavior generated by programs installed on a computer system from interrupting the manufacturing process. By identifying a set of programs that need to be initiated and executed during the manufacturing process, the computer system is configured to initiate only these required programs in response to a reboot of the computer system during the manufacturing process. After the manufacturing process is completed, the computer system is configured to initiate other programs in addition to the required programs. The other programs may include programs that generate splash screens or dialog boxes. Accordingly, a computer system may be rebooted any number of times during the manufacturing process while avoiding any unpredictable behavior that may be caused by installed applications.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method performed by a computer system comprising:
   providing a required list of programs to be initiated and executed in response to a reboot request;
   detecting a reboot request;
   in response to detecting the reboot request, comparing the required list to an execute list and altering a first entry associated with a first program in the execute list to prevent the first program from being initiated in response to rebooting the computer system;
   rebooting the computer system; and
   in response to rebooting the computer system, initiating a second program associated with a second program entry on the execute list.

2. The method of claim 1, further comprising:
   in response to rebooting the computer system, not initiating the first program.

3. The method of claim 1, further comprising:
   in response to detecting the reboot request:
      altering the first entry by removing the first entry from the execute list; and
      adding the first entry to a removed list.

4. The method of claim 3, further comprising:
   in response to detecting the reboot request, adding the first entry to the removed list in response to not detecting the first entry on a required list.

5. The method of claim 3, further comprising:
   in response to completing a software installation process, returning the first entry to the execute list.

6. The method of claim 1, further comprising:
   detecting the reboot request in response to installing an application on the computer system.

7. A computer program product comprising:
   a computer program processable by a computer system for causing the computer system to:
      review a required list of programs to be initiated and executed in response to a reboot request;
      detect a reboot request;
      in response to detecting the reboot request, compare the required list to an execute list and alter a first entry associated with a first program in an execute list to prevent the first program from being initiated in response to rebooting the computer system;
      reboot the computer system; and
      in response to rebooting the computer system, initiate a second program associated with a second program entry on the execute list; and
   an apparatus from which the computer program is accessible by the computer system.

8. The computer program product of claim 7, wherein the computer program is processable by the computer system for causing the computer system to:
   in response to rebooting the computer system, not initiate the first program.

9. The computer program product of claim 7, wherein the computer program is processable by the computer system for causing the computer system to:
   in response to detecting the reboot request:
      alter the first entry by removing the first entry from the execute list; and
      add the first entry to a removed list.

10. The computer program product of claim 9, wherein the computer program is processable by the computer system for causing the computer system to:

in response to detecting the reboot request, add the first entry to the removed list in response to not detecting the first entry on a required list.

11. The computer program product of claim 9, wherein the computer program is processable by the computer system for causing the computer system to:

in response to completing a software installation process, return the first entry to the execute list.

12. The computer program product of claim 7, wherein the computer program is processable by the computer system for causing the computer system to:

detect the reboot request in response to installing an application on the computer system.

13. A system comprising:

a first computer system for:
- providing a required list of programs to be initiated and executed in response to a reboot request:
- detecting a reboot request;
- in response to detecting the reboot request, comparing the required list to an execute list and altering a first entry associated with a first program in an execute list to prevent the first program from being initiated in response to rebooting the first computer system;
- rebooting the first computer system; and
- in response to rebooting the computer system, initiating a second program associated with a second program entry on the execute list.

14. The system of claim 13, wherein the first computer system is for:

in response to rebooting the first computer system, not initiating the first program.

15. The system of claim 13, wherein the first computer system is for:

in response to detecting the reboot request:
- altering the first entry by removing the first entry from the execute list; and
- adding the first entry to a removed list.

16. The system of claim 15, wherein the first computer system is for:

in response to detecting the reboot request, adding the first entry to the removed list in response to not detecting the first entry on a required list.

17. The system of claim 15, wherein the first computer system is for:

in response to completing a software installation process, returning the first entry to the execute list.

18. The system of claim 13, wherein the first computer system is for:

detecting the reboot request in response to installing an application on the first computer system.

19. The system of claim 13, further comprising:

a second computer system coupled to the first computer system, the second computer system for:
- causing an application to be installed on the first computer system.

* * * * *